United States Patent [19]

Harvey et al.

[11] Patent Number: 4,804,693
[45] Date of Patent: * Feb. 14, 1989

[54] CRACK RESISTANT COATING FOR MASONRY STRUCTURES

[75] Inventors: John D. Harvey, Versailles; Andre V. Gindre, Gif S/Yvette, both of France

[73] Assignee: The Goodyear Tire & Rubber Company, Akron, Ohio

[*] Notice: The portion of the term of this patent subsequent to Jan. 6, 2004 has been disclaimed.

[21] Appl. No.: 944,082

[22] Filed: Dec. 22, 1986

Related U.S. Application Data

[60] Continuation-in-part of Ser. No. 771,746, Sep. 3, 1985, Pat. No. 4,634,724, which is a division of Ser. No. 645,989, Aug. 31, 1984, Pat. No. 4,562,109.

[51] Int. Cl.$^4$ ............................ C08K 3/40; C08K 7/20
[52] U.S. Cl. ..................................... 523/219; 427/243; 427/393.6; 427/407.1; 427/419.5; 428/220; 428/313.5; 428/313.9; 428/325; 428/327; 428/703; 524/472; 524/494; 524/562; 524/575; 524/792
[58] Field of Search ................ 523/219; 524/494, 562, 524/575, 792, 472; 427/243, 393.6, 407.1, 419.5; 428/220, 313.5, 313.9, 325, 327, 703

[56] References Cited

U.S. PATENT DOCUMENTS

| | | | |
|---|---|---|---|
| 2,824,502 | 2/1958 | Rockwell et al. | 523/219 |
| 2,897,732 | 8/1959 | Shuger | 523/219 |
| 3,036,928 | 5/1962 | Poole | 523/219 |
| 3,230,184 | 1/1966 | Alford | 523/219 |
| 3,418,896 | 12/1968 | Rideout | 523/219 |
| 3,553,002 | 1/1971 | Haraway et al. | 523/219 |
| 3,652,486 | 3/1972 | Young | 523/219 |
| 3,873,475 | 3/1975 | Pechacek et al. | 523/219 |
| 4,053,448 | 10/1977 | Holle | 523/219 |
| 4,086,098 | 4/1978 | Ruyet et al. | 523/219 |
| 4,248,752 | 2/1981 | Myles | 264/30 |
| 4,369,064 | 1/1983 | von Bonin | 521/85 |
| 4,388,424 | 6/1983 | Kennell et al. | 524/562 |
| 4,447,491 | 5/1984 | Bradbury et al. | 428/309.9 |
| 4,634,724 | 1/1987 | Harvey et al. | 523/219 |

FOREIGN PATENT DOCUMENTS

| | | | |
|---|---|---|---|
| 563840 | 9/1958 | Canada . | |
| 817472 | 7/1969 | Canada . | |
| 2307092 | 11/1976 | France . | |
| 2367716 | 12/1978 | France . | |
| 0069926 | 6/1977 | Japan | 523/219 |

*Primary Examiner*—Herbert J. Lilling
*Attorney, Agent, or Firm*—Alvin T. Rockhill

[57] ABSTRACT

Masonry structures are susceptible to cracking due to distortion caused by movement of their foundation, vibration, and/or drying out subsequent to the construction of the structure. Such cracking often occurs after the structure has been painted. This results in the crack being transmitted through the coating of paint. Upon repainting of the masonry structure new cracks often develop and are transmitted through the paint coating within a short period of time.

This invention discloses a crack resistant coating for masonry structures comprising:
(1) a crack absorbing layer which is contiguous to the masonry structure which contains beads which are essentially spherical and which are bound by a resin binder, and
(2) a conventional coating layer which is contiguous to and covers the crack absorbing layer.

12 Claims, 1 Drawing Sheet

CRACK RESISTANT COATING FOR MASONRY STRUCTURES

This is a continuation-in-part of application Ser. No. 771,746, filed on Sep. 3, 1985 (now U.S. Pat. No. 4,634,724), which is a divisional of application Ser. No. 645,989, filed on Aug. 31, 1984 (now issued as U.S. Pat. No. 4,562,109).

BACKGROUND OF THE INVENTION

The cracking of masonry structures is a very well known phenomenon. Concrete walls, concrete block walls, stone walls and brick walls are all very susceptible to cracking. This cracking is sometimes due to distortion caused by movements in the foundation of the masonry structure. In other cases, crack formation is caused by vibrations in the masonry structure and/or drying out subsequent to the construction of the structure. Such cracking can occur after various time periods including shortly after the masonry structure is constructed to periods many years after the construction of the structure. Unfortunately, such cracks are generally transmitted through layers of paint which coat such masonry structures.

Masonry structures are painted with exterior coatings of varying thicknesses both to provide the masonry structure with a degree of protection and as a decoration. The propagation of cracks through the coating destroys both the coatings aesthetic beauty and the protection that it provides to the masonry structure. Cracks which are transmitted through such an exterior coating layer are both unsightly and provide a point at which moisture can penetrate into the masonry structure. For example, wind can drive rain into such cracks with the moisture being further transmitted into the structure by capillary forces into the interior of the structure causing dampness, degradation of the material, and a reduction of the thermal insulation efficiency of the masonry structure. At the same time, an acceleration in the degradation of the exterior takes place due to moisture and its expansion during freezing which acts between the coating and substrate as well as opening the crack in the masonry structure even wider.

Systems are known which are designed to fill or cover cracks which have already formed, such as sealants and mastics. These materials have a chewing gum-like consistency which will accommodate a certain degree of crack enlargement, but at the same time have limited adhesion. Flexible coating systems are partially effective, but do not offer a totally satisfactory solution for cracking in masonry structures.

SUMMARY OF THE INVENTION

The present invention relates to a crack resistant coating for masonry structures. This coating is comprised of a crack absorbing layer which is applied directly onto the masonry structure with a final conventional coating layer being applied to it. The crack absorbing layer does not allow for cracks which develop in the masonry structure to be transmitted to the final (outside) coating layer. The final coating layer is essentially a conventional coating which is applied to the crack absorbing layer and forms the outer surface of the crack resistant coating.

This invention more specifically describes a crack resistant coating for masonry structures comprising:

(1) a crack absorbing layer which is contiguous to the masonry structure which contains beads which are essentially spherical and which are bound by a resin binder, and (2) a conventional coating layer which is contiguous to and covers the crack absorbing layer.

A process for coating a masonry structure with a crack resistant coating is also described with this process comprising:

(1) applying a crack absorbing layer to the masonry structure wherein the crack absorbing layer contains beads which are essentially spherical and which are bound by a resin binder, and (2) applying a conventional coating layer to the crack absorbing layer.

This invention further reveals a composition for application to masonry structures as a crack absorbing layer comprising a plurality of beads which are essentially spherical in structure which are homogeneously mixed throughout a resin binder solution having a viscosity of from about 0.5 to about 10 poise at 10,000 seconds$^{-1}$ and a Brookfield viscosity of at least 600 poise at 10 rpm.

DETAILED DESCRIPTION OF THE INVENTION

Figure 1:
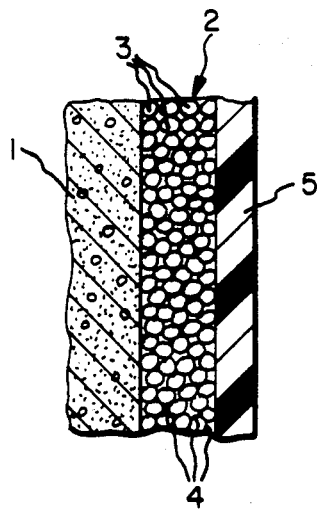

The present invention will become more apparent from the following detailed description and accompanying drawings, in which FIG. 1 is a cross-sectional view of a masonry structure which has been coated with the crack resistant coating of this invention.

As can be seen by referring to FIG. 1 the masonry structure 1 is coated with a crack resistant coating which is comprised of two layers. These layers are a crack absorbing layer 2 which is applied directly onto the masonry structure 1 so as to be adjacent and contiguous to it and a conventional coating layer 5 which is applied to the crack absorbing layer 2 so as to be adjacent and contiguous to it. The crack absorbing layer 2 is comprised of beads 3 which are essentially spherical and which are bound by a resin binder 4.

Essentially any type of masonry structure can be treated with the crack resistant coatings of this invention. For example, the crack resistant coatings of this invention can be applied to concrete or cement walls, brick wall, stone walls, and the like.

The crack absorbing layer is applied to the masonry structure as a composition which is comprised of the beads which are homogeneously mixed throughout a resin binder solution having a viscosity of from 0.5 to 10 poise at 10,000 seconds$^{-1}$ and a Brookfield viscosity of at least 600 poise at 10 rpm (revolutions per minute). This composition has a consistency that allows it to be troweled onto a vertical masonry structure, such as a wall. It is important for this composition to have a consistency that is thick enough to keep it from running after application to a vertical masonry structure. It is preferred for the resin binder solution to have a viscosity ranging from 2 to 6 poise at 10,000 seconds$^{-1}$ and a Brookfield viscosity of about 750 poise at 10 rpm.

Many materials are suitable for use as the resin binder in the crack absorbing layer. However, it is important for the resin binder to exhibit sufficient flexibility to allow a degree of rolling action between the beads in order to absorb cracks which form in the masonry structure. It is also important for the resin binder to exhibit sufficient adhesive properties so as to hold the beads together as well as holding the crack absorbing layer to the masonry structure.

A variety of polydiene resins exhibit the properties that are necessary for the binder resin. Such polydiene resins will normally also contain one or more vinyl-substituted aromatic monomers. Polydiene resins of this type are prepared by polymerizing one or more diene monomers with one or more vinyl-substituted aromatic monomers. Such diene/vinyl-substituted aromatic resin copolymers will generally contain from about 70 weight percent to about 90 weight percent of the vinyl-substituted aromatic monomer and from about 10 weight percent to about 30 weight percent of the diene resin. Pliolite TM S-5 which is sold by The Goodyear Tire & Rubber Company is an example of such a diene/-vinyl-substituted aromatic resin. Some representative examples of such diene monomers include 1,3-butadiene, isoprene, 2,3-dimethyl-1,3-butadiene, 2-ethyl-1,3-butadiene, 1,3-pentadiene, 2-methyl-1,3-pentadiene, 1,3-hexadiene, 2-phenyl-1,3-butadiene, 1,3-heptadiene, 1,3-octadiene, 3-methyl-1,3-pentadiene, 4-methyl-1,3-pentadiene and the like. Isoprene and 1,3-butadiene are the most commonly used diene monomers in the polydiene resins which are used as resin binders in the practice of this invention. Styrene, α-methylstyrene, vinyl toluene, 3-methylstyrene, 4-methylstyrene, 4-cyclohexylstyrene, para-chlorostyrene, 3-vinyl- methylstyrene, 4-vinylmethylstyrene, 1-vinylnapthalene, 2-vinylnapthalene, and 4-para-tolylstyrene are some representative examples of vinyl-substituted aromatic monomers that can be polymerized into the resin binders of this invention.

Copolymers of vinyl-substituted aromatic monomers and acrylates are also useful as resin binders in the practice of this invention. The most common acrylates used in these copolymers are 2-ethylhexylacrylate, isobutyl methylacrylate, and methyl methacrylate. The monomer ratio of vinyl-substituted aromatic monomers to acrylate monomers in these copolymers can vary greatly. However, in most cases, such copolymers which are used as resin binders will contain from 15 weight percent to 60 weight percent acrylate monomer and from 40 weight percent to 85 weight percent vinyl-substituted aromatic monomer. Such resins are commercially available from a variety of sources and include Pliolite TM AC-4 and Pliolit TM AC-80 which are sold by The Goodyear Tire & Rubber Company. Pure acrylic resins, for example polyisobutyl methacrylate or combinations of other acrylic monomers would also provide suitable binder resins.

In some cases it will be advantageous to use a plasticizer in the binder resin in order to attain the properties which are desired. Numerous plasticizers can be used for this purpose. Some commonly used plasticizers include halogenated paraffins (particularly chlorinated paraffins), butyl stearate, dibutyl maleate, dibutyl phthalate, dibutyl sebacate, diethyl malonate, dimethyl phthalate, dioctyl adipate, dioctyl phthalate, ethyl cinnamate, methyl oleate, tricresyl phosphate, trimethyl phosphate, tributyl phosphate and trioctyl adipate. Persons skilled in the art will be able to select the type and amount of plasticizers needed in order to attain the requisite combination of properties needed in the binder resin.

The resin binder is dissolved in a suitable solvent in order for the beads to be mixed throughout it for application to the masonry structure. Persons skilled in the art will be able to easily select an appropriate solvent for the particular binder resin being used. Some solvents which are commonly used for this purpose include white mineral spirits (containing pure aliphatic or aromatic solvents or blends of both), methylene chloride, ethylene chloride, trichloroethane, chlorobenzene, acetone, methyl ethyl ketone, methyl isobutyl ketone, methyl isoamyl ketone, diisobutyl ketone, ethyl acetate, propyl acetate, butyl acetate, isobutyl isobutyrate, benzene, toluene, xylene, ethyl benzene, cyclohexanone, and carbon tetrachloride. Water can also be used in conjunction with an appropriate emulsifier as a medium in which the binder resin can be dispersed. Such an aqueous resin binder dispersion can be used as a medium through which the beads can be homogeneously mixed for application to the masonry structure.

In some cases it will be necessary for the resin binder solution or aqueous resin binder dispersion to further contain a thickener in order to attain a viscosity which is in the required range. These thickeners can be either organic or mineral. For example, hydrogenated castor oil, clay, or hydroxy ethyl cellulose can be used as the thickener. Certain resin binders will not require the employment of any external thickeners. For instance, in cases where Pliolit TM AC-4 is used as the resin binder no external thickeners are required in order to attain the necessary Brookfield viscosity for the resin binder solution. Persons skilled in the art will be able to adjust the amount of thickener, plasticizer, and solvent in order to obtain the required viscosity for the resin binder solution. For instance, if Pliolite TM AC-4 is selected as the resin binder a suitable ratio of resin to plasticizer will be within the range of 4:1 to 1:4. A preferred ratio of resin binder to plasticizer for Pliolite TM AC-4 is about 1:1.

The beads which are mixed throughout the resin binder solution can be solid or cellular and generally have an average diameter ranging from 0.5 mm (millimeter) to about 6 mm. In most cases such beads have an average diameter ranging from 0.7 mm to about 4 mm. Some representative examples of suitable beads include solid glass beads, cellular (blown) glass beads, and expanded polystyrene beads. A particular advantage offered by cellular glass beads and expanded polystyrene beads is their ability to improve thermal insulation.

In some cases it will be desirable to allow the solvent in the resin binder solution to evaporate allowing the crack absorbing layer to "set up" before applying the final coating layer. The final coating layer is essentially a conventional paint or coating which is applied to the crack absorbing layer. Thus, the conventional coating layer is adjacent and contiguous to the crack absorbing layer. The crack absorbing layer will protect the final coating layer (conventional coating layer) from cracks which form in the masonry structure. The crack absorbing layer absobs cracks rather than transmitting them to the outer coating which in this case is the conventional coating layer. The crack absorbing layer can protect the final coating layer from cracks as large as 5 mm in width which form in the masonry structure. The degree of protection provided by the crack absorbing layer from cracking in the masonry structure is somewhat dependent upon its thickness. Thicker crack absorbing layers naturally provide a higher degree of protection for the final coating layer than do thinner crack absorbing layers. Normally the crack absorbing layer will have a thickness ranging from about 0.3 to about 3 centimeters. More commonly, the crack absorbing layer will have a thickness ranging from 1 to 2 centimeters.

This invention is illustrated by the following example which is merely for the purpose of illustration and is not to be regarded as limiting the scope of the invention or manner in which it may be practiced. Unless specifically indicated otherwise, parts and percentages are given by weight.

EXAMPLE 1

Two pieces of asbestos sheeting were placed together side to side. These pieces of asbestos sheeting were squares measuring 10 cm by 10 cm. Thus, when the two pieces of sheeting were placed together, a rectangular surface measuring 10 cm by 20 cm was formed. This surface was then coated with a resin binder solution which contained beads which were essentially spherical to provide a crack absorbing layer. This coating of the crack absorbing layer was about 1.2 cm thick.

The resin binder used was Pliolit TM AC-4 which is sold by The Goodyear Tire & Rubber Company. The solvent used for making the resin binder solution was white mineral spirits which contained about 50% to 60% aromatics. The resin binder solution also contained a chlorinated paraffin plasticizer. The total solids content of the resin binder solution was 20% with it containing 15% binder resin and 5% plasticizer. The beads used in the crack absorbing layer were Expanver TM cellular glass beads having an average diameter of about 0.4 cm.

The crack absorbing layer was then coated with a conventional decorative thick coating which contained a white pigment. The coating was then allowed to dry or "set-up". The two pieces of coated asbestos sheeting were then pulled apart to a distance of 5 mm. Thus, the crack absorbing layer was stretched to absorb a 5 mm crack. The outside coating did not crack.

This experiment shows that this crack resistant coating will not crack even when the masonry structure it is coating develops a 5 mm crack. The crack absorbing layer absorbed the 5 mm crack, and it was not transmitted through the final coating layer.

While certain representative embodiments and details have been shown for the purpose of illustrating the invention, it will be apparent to those skilled in this art that various changes and modifications may be made therein without departing from the scope of the invention.

What is claimed is:

1. A composition for application to masonry structures as a crack absorbing layer comprising a plurality of solid or cellular beads which are essentially spherical in structure and which have an average diameter ranging from 0.5 mm to about 6 mm, which are homogeneously mixed throughout a resin binder solution which is comprised of a resin binder and a suitable solvent wherein said resin binder solution has a viscosity of from about 0.5 to about 10 poise at 10,000 seconds$^{-1}$ and a Brookfield viscosity of at least 600 poise at 10 rpm.

2. A composition as specified in claim 1 wherein said beads have a diameter of from about 0.7 mm to about 4 mm.

3. A composition as specified in claim 2 wherein said resin binder solution further comprises a plasticizer.

4. A composition as specified in claim 3 wherein said beads are cellular glass beads.

5. A composition as specified in claim 4 wherein said resin binder solution has a viscosity of from 2 to 6 poise at 10,000 seconds$^{-1}$ and a Brookfield viscosity of about 750 poise at 10 rpm.

6. A composition as specified in claim 1 wherein said resin binder solution further comprises a plasticizer.

7. A composition as specified in claim 6 wherein said resin binder solution has a viscosity of from 2 to 6 poise at 10,000 seconds$^{-1}$ and a Brookfield viscosity of about 750 poise at 10 rpm.

8. A composition as specified in claim 7 wherein the resin binder is a copolymer of one or more vinyl-substituted aromatic monomers and one or more acrylate monomers.

9. A composition as specified in claim 8 wherein said plasticizer is a chlorinated paraffin.

10. A composition as specified in claim 9 wherein said beads are cellular glass beads.

11. A composition as specified in claim 1 wherein said resin binder solution is comprised of white mineral spirits and a copolymer of one or more vinyl-substituted aromatic monomer and one or more acrylate monomers.

12. A composition as specified in claim 11 wherein said resin binder further comprises a chlorinated paraffin as a plasticizer.

* * * * *